Dec. 6, 1955    A. W. VIBBER    2,725,711
TWISTING SPINDLE BALLOON CONTROL
Filed April 27, 1951    2 Sheets-Sheet 1
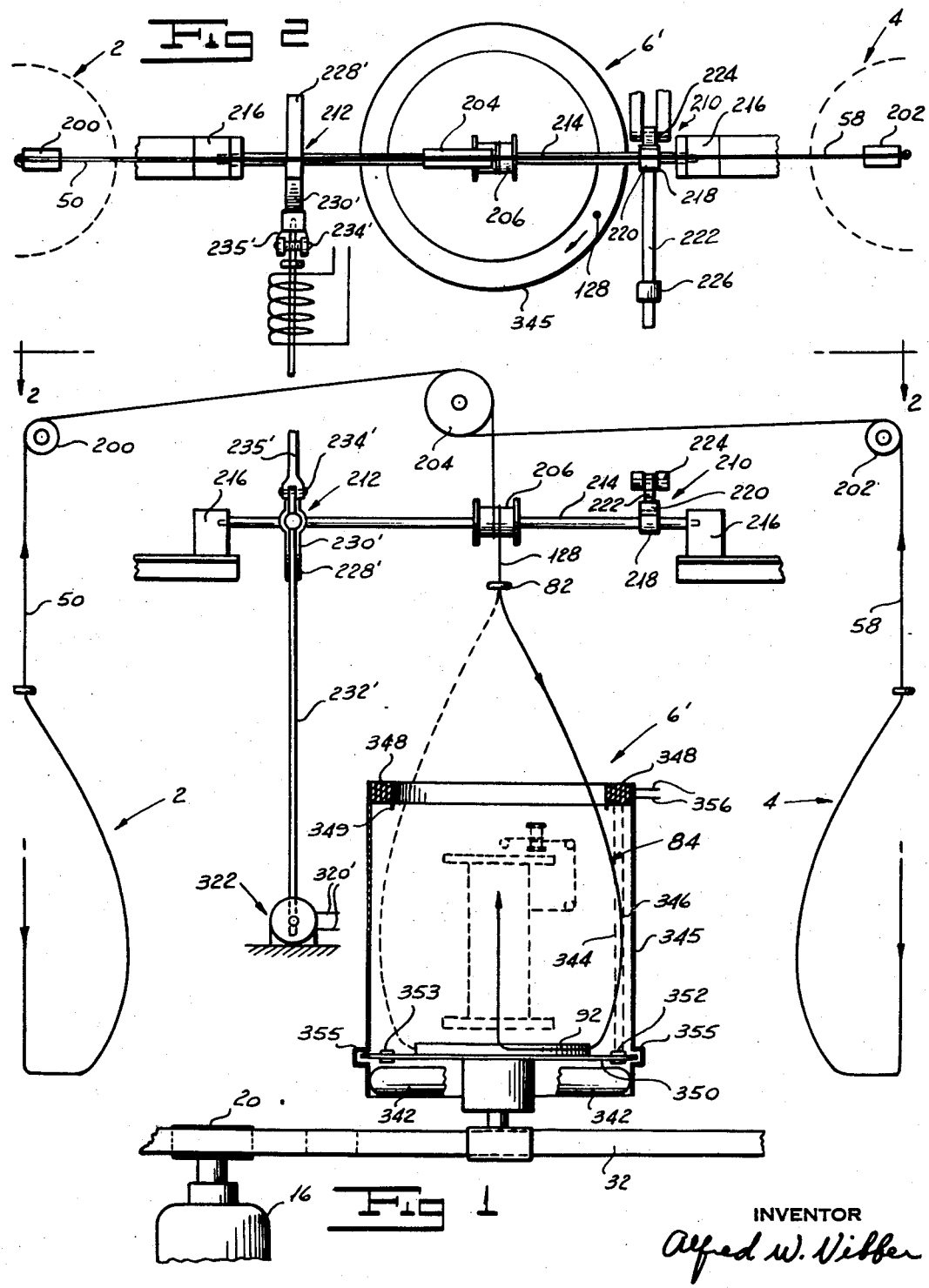
INVENTOR
Alfred W. Vibber

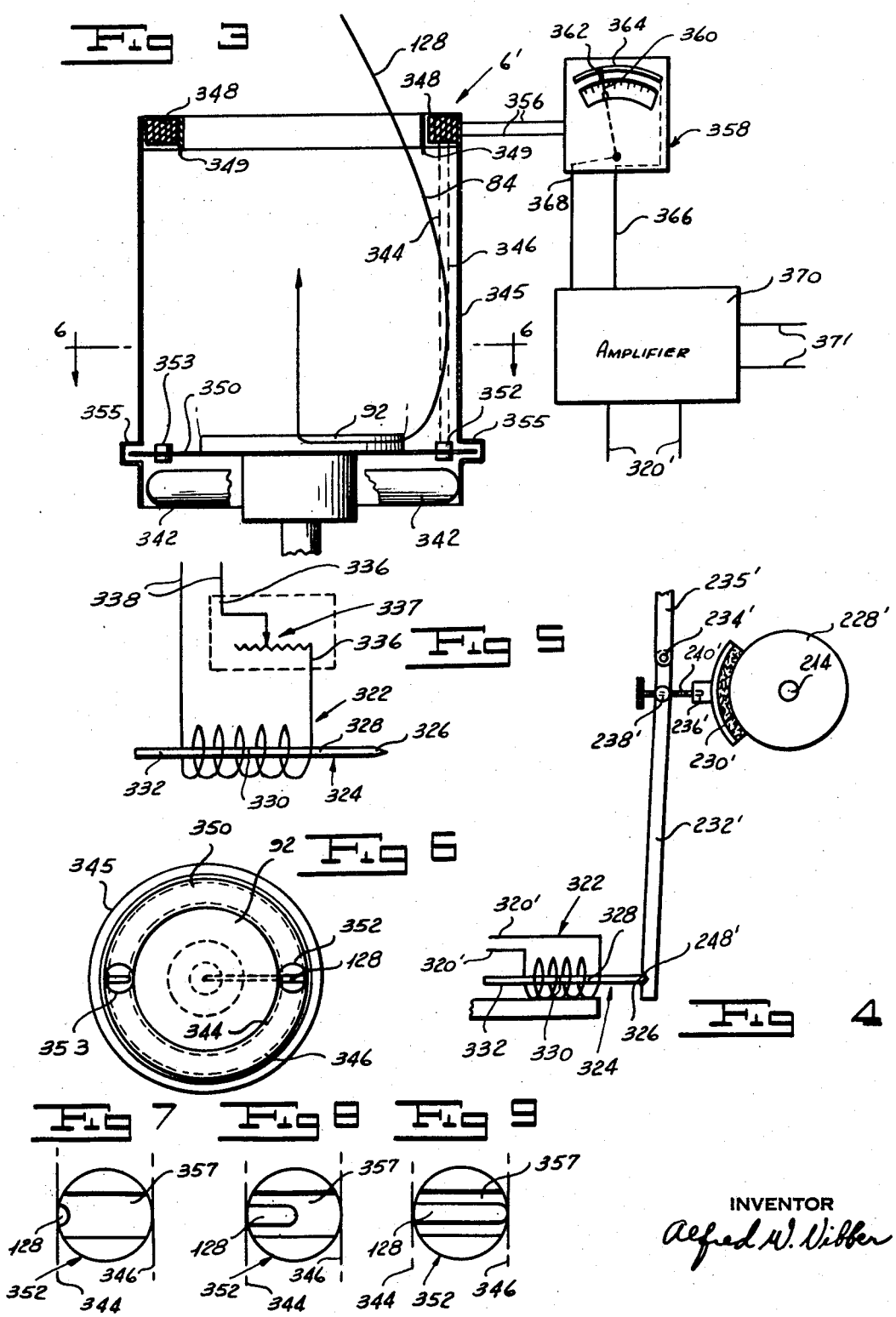

United States Patent Office 2,725,711
Patented Dec. 6, 1955

2,725,711

TWISTING SPINDLE BALLOON CONTROL

Alfred W. Vibber, Ridgewood, N. J.

Application April 27, 1951, Serial No. 223,188

12 Claims. (Cl. 57—58.83)

This invention relates to a method of and an apparatus for continuously measuring the diameter of a rapidly rotating object. More specifically, the invention relates to a method of and apparatus for measuring the diameter of a free-flying loop or balloon of elongated flexible material such as yarn, as in a yarn twisting spindle. The invention further relates to a method of and an apparatus for continuously measuring the diameter of such flying loop or balloon of elongated flexible material associated with a twisting spindle and for automatically and continuously controlling the diameter of such balloon in accordance with such measurements.

This application is a continuation-in-part of application Serial No. 214,866, filed March 10, 1951, and bearing the same title.

As above stated, in its broader aspects the present invention is concerned with the measurement of the diameter of rapidly rotating objects. One particular object of such kind is the aforesaid flying loop or balloon of elongated flexible material associated with a twisting spindle. It is very difficult, if not impossible, rapidly to measure the diameter of such balloon by known methods and apparatus. The balloon cannot readily be contacted by a measuring instrument while it is rotating, since to do so would scuff the material in the balloon and would also tend to cause breakage of the material in the balloon. The balloon, of course, ceases to exist when the flyer which creates and maintains it is stopped from rotation.

Possible known methods of measuring such balloon include the sighting along opposite sides thereof, as with a transit, but such operation takes too long if any use is to be made of the measurement in the continuous and instantaneous controlling of the balloon, since the balloon very frequently tends rapidly to fluctuate in diameter. As above indicated, in specific embodiments of the invention use is made of the continuous measurements of the diameter of the balloon in controlling such diameter. It has formerly been attempted, in apparatus in which the tension produced in a balloon at the take-up twisting spindle has been balanced against the one or more balloons of the one or more supply spindles, to position a fixed tension imposing device between such supply balloon or balloons and the take-up balloon. Since the tension in such balloons (and thus in the spans leading from them and to them, respectively) does not stay constant, due to minute variations in the gauge and moisture content of the elongated flexible materials such as yarn, and thus of the weight of the material in each balloon, it is not possible to maintain substantially constant diameter of the take-up balloon by use of a tension compensating means which imposes a fixed retarding tension on such material.

It has also been attempted to employ a variable retarding means between the supply and take-up balloons, such retarding means being variable in response to the variations in tensions of the material travelling therepast. Such devices, however, have been complicated, difficult to maintain, and whereas, when they work, they did maintain the size of the take-up balloon within fairly narrow limits, for appreciable lengths of time, they did so only as a fairly reliable concomitant result of imposing a substantially constant retarding force on the material entering the cabling balloon. Even with the described variable retarding means, however, the system did not insure or work primarily toward the maintenance of a substantially constant cabling spindle balloon size.

The apparatus of the invention insures a substantially constant cabling spindle balloon diameter by first, establishing a standard desired predetermined take-up balloon diameter, second, measuring variations in diameter of such take-up balloon from such standard diameter, and, third, employing such variations from the standard in diameter to vary the tension in the balloon thereby to insure the maintenance of the diameter of the balloons substantially constant.

Generally the apparatus of the invention employs a photo-electric scanning system, the amount of light reaching the photo-electric cell from the light beam which is intercepted by the balloon of opaque or semi-opaque elongated flexible material at the twisting spindle, when such balloon has a diameter within desired predetermined limits, giving a measurement of the instantaneous diameter of such balloon. The current output of the cell may readily be converted, as by calibration of the measuring instrument, so that such measurements may be read directly in terms of diameter of the object being measured. As is well-known, visible light is a portion of the electro-magnetic wave spectrum lying within certain limits, and a photo-electric device is a means responsive to the impingement thereon of that portion of the electro-magnetic wave spectrum.

In further embodiments of the apparatus and method of the invention, the method and apparatus above described as used for measuring the diameter of the object are used to control the tension in the elongated flexible material in the balloon being measured. In specific embodiments of the apparatus to be described, the tension of such material at the incoming end of the balloon is varied in accordance with changes in the measurement of diameter of the balloon, thereby to maintain the balloon diameter substantially constant.

The invention will be more readily understood by reference to the accompanying drawings forming a part of the specification.

In such drawings:

Fig. 1 is a somewhat diagrammatic, over-all view, in side elevation of a twisting and doubling apparatus for forming cord from yarns, such apparatus embodying the preferred embodiment of the balloon control apparatus described as a means for controlling the diameter of the center, take-up balloon;

Fig. 2 is a fragmentary view in plan of the apparatus in the vicinity of the center, take-up, spindle, showing the primary and secondary tension imposing means and their relationship with the center spindle;

Fig. 3 is an enlarged view, partially in axial cross-section and partially in front elevation, of the cabling spindle and attendant balloon measuring parts employed in Figs. 1 and 2;

Fig. 4 is a fragmentary view of the secondary retarding or braking apparatus employed in the illustrative embodiment of the invention;

Fig. 5 is a somewhat diagrammatic view of a further embodiment of the electro-magnetic secondary brake applying solenoid and the wiring system thereof;

Fig. 6 is a view in horizontal section through the spindle of Fig. 3, the section being taken along the line 6—6 in Fig. 3;

Fig. 7 is a view in plan of the optical slit and lens means when the cord in the balloon is just entering such slit from the inner boundary line of the zone illuminated by the light source;

Fig. 8 is a similar view of the slit and lens when the cord in the balloon occupies its medial position;

Fig. 9 is a similar view of such slit and lens when the balloon has expanded so that the cord therein lies along the outer boundary line of the zone illuminated by the light source.

In the illustrative embodiment of the apparatus the singles supply two-for-one twisting spindles 2 and 4 are driven, as shown, at the same constant high speed and in the same direction by means of the belt 32 entrained over pulley 20 of motor 16. The central cabling two-for-one spindle 6' is driven in the opposite direction at a slightly slower but constant high speed. The twisted singles 50 and 58 proceed upwardly from the balloons of their respective two-for-one spindles 2 and 4 over the idle guide pulleys 200 and 202, respectively, and thence to the idle gathering pulley 204, from which the combined generally parallel, but as yet untwisted-upon-eachother, threads are led to the drum 206 of the tension imposing means. After passing around drum 206 several times, thereby to minimize slippage between it and the drum, the combined material 128 is led downwardly through the eye 82 and thence into the incoming or infeeding balloon 84 of the spindle 6'. The cord is positively withdrawn from the balloon 84 by means of an auxiliary capstan positioned atop spindle 6' and driven in synchronism therewith in the manner shown in the patent to Uhlig, No. 2,654,211, issued October 6, 1953.

The tension imposing drum 206 is, in the embodiment shown, under the control of a primary retarding or braking means 210 and of a secondary retarding or braking means 212. Drum 206 is mounted upon the rotatably mounted horizontal shaft 214 which, as shown, is mounted in the pillow blocks 216 supported on appropriate portions of the machine frame. The primary retarding or braking means 210 is designed to impose, once the machine has been placed in operation and adjusted, a constant retarding torque upon the drum 206. The secondary retarding or braking means 212 is designed to impose upon the drum 206 a small medial tension when the balloon 84 is of the desired diameter, to impose a constantly increasing retarding force on the drum as the balloon 84 expands, and to impose upon drum 206 a constantly decreasing retarding force as balloon 84 contracts in diameter, thereby to maintain the balloon 84 of substantially constant diameter.

The construction of the primary retarding means 210 is shown more clearly in Fig. 2. As there shown, there is secured to the shaft 214 a relatively small brake drum 218. Pivoted to a portion of the machine frame, as shown in Fig. 2, by means of the pivot pin 224, is a brake lever 222. Pivoted to such brake lever at a position above brake drum 218 is a brake shoe 220, the brake shoe being held against the brake drum with an adjustable force by means of the slidable U shaped weight 226 which may be positioned on the brake lever at predetermined adjustable distances from the pivot pin 224. Means 210, therefore, after once being adjusted and with the machine in operating condition will impose upon the drum 206 a constant retarding torque.

The secondary retarding means 212 comprises, as shown, a large brake drum 228', likewise affixed to shaft 214, a brake shoe 230' cooperating therewith (Fig. 4) and means to thrust such brake shoe against brake drum 228' with varying force, such brake shoe operating mechanism being under the control of a balloon diameter detecting or measuring device. The brake shoe operating mechanism, in the embodiment shown, consists of a lever 232' pivoted at its upper end by the pivot pin 234' to the depending frame member 235'. Secured to the upper end of lever 232' immediately below pivot pin 234' is the sidewardly projecting boss member 238' which threadedly receives therethrough the screw member 240' which, as shown, is provided with an adjusting handle. The inner end of screw 240' is rounded and smooth, being received within a slightly larger correspondingly shaped recess in the projection 236' on the rear of the brake shoe 230'. The described mechanism permits the brake shoe 230' to be initially applied to the brake drum 228' with a known pressure resulting from the thrusting of brake lever 232' clockwise by adjustment of screw 240' to a position slightly off the vertical as shown in Fig. 4. Thus, under static conditions the secondary brake applies a small known retarding force to the drum 206' by reason of the effect of gravity upon lever 232'.

To such small static retardation there is added, under running conditions of the machine, a retarding force which bears a direct, empirical, relationship to the diameter of the balloon to be controlled. In this invention such additional retarding force is applied by the electro-magnetic secondary brake applying mechanism of Fig. 4 under the control of a photo-electric scanning means for instantaneously measuring the diameter of balloon 84. Such photo-electric scanning device, shown more particularly in Figs. 1, 2, and 3, continuously measures the diameter of the balloon within certain predetermined desired limits and employing such measurements, in the illustrative embodiment varies the tension in the material in the balloon by controlling the electromagnetically operated secondary tension imposing means to vary the tension on the entering end of the balloon, whereby to maintain the diameter of the balloon substantially constant.

The elongated flexible material 128 in balloon 84 enters such balloon through the eye 82, is drawn in through the flyer 92, and is coiled in the spindle after having been drawn upwardly from the axially hollow shaft therein. Spindle 6' is equipped with a cylindrical external guard 345 to the inner top surface of which, out of the path of travel of balloon 84, and coaxial of spindle 6', there is affixed the annular photo-electric cell 348, the bottom side of such annular cell comprising a light receiving lens, such lens being secured from reception of vagrant light by the aforesaid outer guard of the spindle and by the depending annular inner light shield 349. The light which falls upon cell 348 is derived substantially solely from the light source 342, which in this instance is an annular fluorescent tube positioned axially of cell 348 and at the bottom of the outer guard of the spindle. To the bottom of the flyer 92 there is affixed the circular shutter-forming disc 350 coaxial with the flyer, the outer edges of such disc protruding into the annular light trap 355 formed on the outer guard of the spindle. The main body of the disc 350 is imperforate except for the collimating lens system 352 positioned at one zone thereof so as to be aligned with the balloon 84 of the material travelling through the spindle. The actual opening through means 352 is substantially in the form of a rectangle having rounded ends, such opening being designated 357 and being shown more particularly in Figs. 7, 8, and 9. A compensating balancing weight 353 is positioned on the disc 350 diametrally opposite means 352, whereby the disc will rotate at high speeds in perfect balance. As the flyer 92 sweeps around carrying with it the balloon 84, the disc 350 similarly travels, the collimating lens means 352 causing a slit of parallel light beams to travel around the spindle, the inner border of such annular path of the light beams being designated 344 and the outer edge thereof being designated 346. The radial width of such light beam, that is, the distance between lines 344 and 346, is chosen as defining the range within which the diameter of the balloon may permissibly vary.

It is apparent from the above that the output in current from photo-electric cell 348 will vary markedly as the diameter of the balloon varies from the line 344 to the line 346. Thus, in Fig. 7, in which the balloon is shown protruding outwardly but slightly past the line 344, such current output of the photo-electric cell will be at a high value, since such cell receives continuously a beam of light from the portion of the slit 357 which is unobscured by the cord 128 of the balloon. When the balloon has expanded to a medial position, as shown in Fig. 8, the output current of cell 348 will decrease since the photo-electric cell receives light only from the unobscured portion of slit 357, such unobscured portion being markedly smaller than that in Fig. 7. When the balloon has expanded so that it coincides with line 346, as shown in Fig. 9, the elongated flexible material 128 will extend completely across the slit 357, thereby still further obscuring such slit and shutting off the light beam to the photoelectric cell, whereby the current output of such cell is at a minimum.

Such current variation in the output of the photo-electric cell may readily be employed as a means of measuring instantaneously the diameter of the balloon as it varies within the limits between lines 344 and 346. Thus, the output of such cell is led through wires 356 to the sensitive galvanometer 358, the needle 360 of which indicates a reading upon the scale, which scale may be calibrated directly in terms of diameter of the balloon. The galvanometer 358 may be made to control, through a suitable variable resistance and amplifier system, the secondary tension imposing device such as shown in Fig. 4, whereby the diameter of the balloon may be maintained substantially constant. Accordingly, there is positioned on the galvanometer above the scale a linear resistance 364 with which the extension 362 of the needle slidingly co-operates. The right-hand end of resistance 364 is connected by wire 366 to the amplifier 370, the other input wire 368 to such amplifier being connected to the needle 360. The amplifier, which is fed by power supplied from wires 371, when of suitable known design will produce at the output leads 320' a voltage which is directly proportional to the effective resistance of the variable resistor composed of parts 362 and 364. Thus, the voltage across wires 320' will vary in accordance with variations in the diameter of the balloon 84, when the balloon is small the voltage across wires 220' being small and when the balloon is large such voltage being large.

The output voltage of wires 320' is employed to operate the secondary tension imposing means 212. To press against the lower end of lever 232' there is employed the solenoid 322 which is connected to the amplifier 370 through the wires 320'. Solenoid 322 is provided with a plunger 324, the right-hand end of which is provided with a knife edge 326 which cooperates with the V shaped recess 248' in the lower end of lever 232'. The right-hand end of the plunger, designated 328, is of non-magnetic material, whereas the left-hand end 332 thereof, beyond junction 330, is of magnetic material. The solenoid 322 is so placed relative to lever 232', as it is shown in Fig. 1, that as the solenoid is increasingly energized its plunger 324 travels in a direction into the paper, to apply braking means 212 more strongly.

The solenoid device of Fig. 5 may be employed in the combination of apparatus shown. In substituting the device of Fig. 5 for that of Fig. 4 to control the secondary tension imposing means, wires 338 are connected to wires 320' from amplifier 370. In the apparatus of Fig. 5 a manually adjustable rheostat 337 is employed between wires 336 to permit initial adjustment of the field strength of solenoid 322.

In a typical twisting operation, the apparatus will be initially adjusted so that the primary retarding means 210 imposes, say, a retarding force of 1790 grams to the material passing around pulley 206 and so that, when the balloon 84 occupies a medial position within the illuminated zone between lines 344 and 346, the secondary retarding means 212 will apply a retarding force of ten grams to the material passing around pulley 206, assuming that for the operation in hand a total medial retarding force of 1800 grams is required. The 1790 grams applied by means 210, of course, remains constant. Should the balloon 84, after the machine has reached a steady operating condition, then expand so that it becomes increasingly close to the line 346 of the illuminated zone with a suitable choice of component sizes the retarding force applied to material 128 by means 212 will rise from ten grams to, say, twenty grams. This, in the particular operation described, will be sufficient to restore the balloon 84 to its medial position, or it may be sufficient to cause it to overrun such medial position. Upon such undue contraction of the balloon, the retarding force applied by means 212 will decrease to, say, five grams, whereupon the balloon 84 will become fuller and tend to regain its medial size. It is thus apparent that the described means affords a ready means for controlling the diameter of the balloon 84 so that it will remain substantially constant. Furthermore, the changes in retarding tension applied by means 212 will be gradual and will almost instantly accompany changes in the position of the balloon. Consequently the balloon will tend to remain steady without much, if any, "hunting."

In the embodiment of the apparatus of the invention above described, the diameter of the balloon may be read directly by the indication of needle 360 on the scale of instrument 358. It is to be understood, however, that in the described embodiment, should it not be desired to read directly the diameter of the balloon the output from the photo-electric cell of such embodiment may be connected directly to a suitable amplifier which, in turn, leads to the variable braking or tension imposing means 322.

Although the apparatus and method of the invention have been described above as measuring the diameter of the balloon of the twisting spindle, and as controlling the balloon diameter in accordance with such measurement, it will be apparent that in the practice of the invention the measurement of balloon diameter, with various known spindle components, will give a measurement of length of the elongated flexible material in the balloon. Thus, with a known constant spindle speed, a known flyer radius, a given speed of travel of the material through the spindle, a given height of the guiding eye above the spindle, a given flyer and yarn passage configuration therein, when a given elongated flexible material of substantially uniform properties longitudinally thereof is twisted in the spindle, the balloon diameter and the length of the material in the balloon bear a determinable, fixed relationship to each other. Such relationship may readily be determined, with a given material and with the various spindle component factors constant, by taking ultra-high speed pictures of the spindle in operation, a succession of pictures being taken at a succession of balloon diameters differing from each other by small increments. The length of the material in the balloon corresponding to each balloon size may then readily be measured from the pictures, and a graph of such values made up. Further, the scale of instrument 358 may be calibrated, if desired, to read directly in terms of the length of the material in the balloon, instead of balloon diameter. As an alternative, the scale of instrument 358 may be calibrated to give simultaneous readings of balloon diameter and length of material in the balloon.

It will be apparent that in the above described method and apparatus the free-flying loop or balloon whose diameter, and thus the length of material therein, is being controlled has such factors thereof held within desired limits by the alteration of the relative speeds at which the material feeds into the loop or balloon and at which it is removed therefrom, such alteration being effected in response to measurement of one or more such factors of the loop or balloon. In the described preferred embodiments of the system the relative material-forwarding speeds of the two material feeding means are varied in the manner above described. The speed of removal of material from the balloon is essentially constant, being carried out by the auxiliary capstan at the cabling and take-up twisting spindle, such capstan being driven by and in synchronism with the main shaft of such spindle, such main shaft being driven at a constant speed. The described embodiments of the apparatus and method vary the speed of entry of the material into the balloon by varying the retarding tension imposed on the infeeding material at the gathering pulley.

Whereas, for purposes of illustration I have shown and described a preferred embodiment of the method of and apparatus for measuring the diameter of rapidly rotating objects such as the balloons of twisting spindles, and I have also described and illustrated a preferred embodiment of the method of and apparatus for controlling the diameter of such balloons, it is to be understood that such embodiments are illustrative only, and that the invention is capable of considerable variation as to details. The invention is, therefore, to be defined by the scope of the claims appended hereto.

I claim as new the following:

1. The method of measuring the diameter of a free-flying balloon of flexible elongated material created and maintained by a flyer, which comprises directing a beam of light along one edge of the balloon parallel to the axis thereof, rotating said beam of light in the same direction as and in synchronism with the flyer, positioning said beam of light so that a portion thereof is normally intercepted by the material in the balloon and that said beam of light extends inwardly of and outwardly from the position of the material in the balloon when the latter is at its medial diameter, and receiving said beam of light beyond the zone of largest girth of the balloon upon a photo-sensitive cell.

2. The method of measuring the diameter of a free-flying balloon of flexible elongated material created and maintained by a flyer, which comprises directing a beam of light along one edge of the balloon parallel to the axis thereof, rotating said beam of light in the same direction as and in synchronism with the flyer, positioning said beam of light so that a portion thereof is normally intercepted by the material in the balloon and that said beam of light extends inwardly of and outwardly from the position of the material in the balloon when the latter is at its medial diameter, receiving said beam of light beyond the zone of largest girth of the balloon upon a photo-sensitive cell and detecting the output current of the cell.

3. The method of controlling the balloon of flexible elongated material at a twisting spindle, comprising directing a beam of light along one edge of the balloon, a portion of said beam of light being normally intercepted by the material in the balloon when the latter is at its medial diameter, receiving said beam of light beyond the balloon upon a photo-electric cell, and causing the output of the cell to vary the tension of the elongated flexible material in the balloon.

4. The method of controlling the balloon of an elongated flexible material twisting spindle, comprising directing a beam of light along one edge of the balloon parallel to the axis thereof, rotating said beam of light in the same direction as and in synchronism with the balloon and positioning said beam of light so that a portion thereof is normally intercepted by the material in the balloon and that said beam of light extends inwardly of and outwardly from the position of the material in the balloon when the latter is at its medial diameter, receiving said beam of light beyond the zone of largest girth of the balloon upon a photo-electric cell, and causing the output of the cell to vary the tension of the elongated flexible material in the balloon.

5. Apparatus for measuring the diameter of a free-flying balloon of flexible elongated material created and maintained by a flyer, which comprises a light source for directing a beam of light along one edge of the balloon, such light beam being of such area and having such direction that a portion of the beam is normally intercepted by the material in the balloon when the latter is at its medial diameter, and a photo-sensitive cell positioned beyond the zone of largest girth of the balloon for receiving the beam of light.

6. Apparatus for measuring the diameter of a free-flying balloon of flexible elongated material created and maintained by a flyer, which comprises a light source for directing a beam of light along one edge of the balloon parallel to the axis thereof, such light beam being of such area and having such direction that a portion of the beam is normally intercepted by the material in the balloon when the latter is at its medial diameter, and a photo-sensitive cell positioned beyond the zone of largest girth of the balloon for receiving the beam of light.

7. Apparatus for measuring the diameter of a free-flying balloon of flexible elongated material created and maintained by a flyer, which comprises a source of light, means for directing a continuously rotating beam of light along one edge of the balloon parallel to the axis thereof, said last named means rotating in synchronism with the flyer, such light beam being of such area and having such direction that a portion of the beam is normally intercepted by the material in the balloon, said beam of light extending inwardly of and outwardly from the position of the material in the balloon when the latter is at its medial diameter, and a photo-sensitive cell positioned beyond the zone of largest girth of the balloon for receiving the beam of light.

8. Apparatus for controlling a free-flying loop of elongated flexible material rotating about an axis comprising means for continuously feeding material into the loop, means for continuously withdrawing material from the loop, means for scanning the loop photo-electrically, and means operative in response to said last named means to vary the relative material-forwarding speeds of the means for feeding the material into the loop and the means for feeding the material out of the loop.

9. The method of controlling the balloon of an elongated flexible material twisting spindle comprising detecting variations in diameter of such balloon from a predetermined standard diameter by scanning the balloon photo-electrically, and varying the tension of the elongated flexible material in the balloon in response to and in accordance with such variations in diameter.

10. The method of controlling the balloon of elongated flexible material at a twisting spindle having a rotatable balloon generating means comprising directing a beam of electro-magnetic waves along an edge of the balloon, receiving the beam of waves beyond the balloon and detecting changes therein, and varying the length of material in the balloon in response to variations in the thus received beam of waves.

11. Apparatus for controlling the balloon of elongated flexible material at a twisting spindle provided with a rotatable balloon generating means comprising means for directing a beam of electro-magnetic waves along an edge of the balloon, means for receiving and detecting changes in the beam beyond the balloon, and means operative in response to said last named means to vary the length of material in the balloon.

12. Apparatus for controlling the balloon of elongated flexible material at a twisting spindle provided with a rotatable balloon generating means comprising means for scanning the balloon photo-electrically, and means operative in response to said last named means to vary the length of material in the balloon.

References Cited in the file of this patent

UNITED STATES PATENTS

| | | |
|---|---|---|
| 1,912,892 | Eitzen | June 6, 1933 |
| 1,959,537 | Kuhne | May 22, 1934 |
| 2,298,992 | Warmisham et al. | Oct. 13, 1942 |
| 2,397,153 | Naumann | Mar. 26, 1946 |
| 2,454,731 | Buckholder | Nov. 23, 1948 |
| 2,487,838 | Uhlig | Nov. 15, 1949 |
| 2,492,737 | Dunn | Dec. 27, 1949 |
| 2,699,701 | Strother et al. | Jan. 18, 1955 |

FOREIGN PATENTS

| | | |
|---|---|---|
| 854,587 | Germany | Nov. 6, 1952 |